5706X
J. Hurd, Jr.
Hot-Air Furnace.
Patented Nov. 10, 1829.
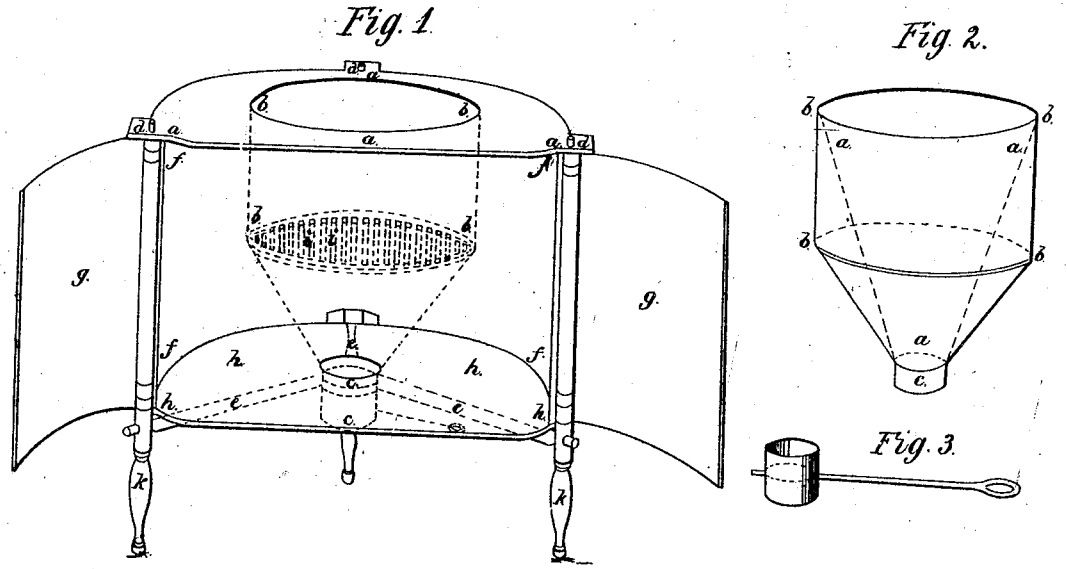

United States Patent Office

PTO - BOYERS, PA Duty Station

MISSING PAGE TEMPORARY NOTICE

PATENT # 5706 X FOR ISSUE DATE 11-10-1829

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

[illegible]

Data Conversion Operation

Boyers, Pa